United States Patent
Rheme et al.

(10) Patent No.: US 6,654,519 B2
(45) Date of Patent: Nov. 25, 2003

(54) OPTICAL DEVICE

(75) Inventors: Charles Rheme, Posieux (CH); Peter Heimlicher, Fribourg (CH)

(73) Assignee: Optosys SA (CH)

( * ) Notice: Subject to any disclaimer, the term of this patent is extended or adjusted under 35 U.S.C. 154(b) by 113 days.

(21) Appl. No.: 10/045,788

(22) Filed: Jan. 11, 2002

(65) Prior Publication Data

US 2002/0097959 A1 Jul. 25, 2002

(30) Foreign Application Priority Data

Jan. 19, 2001 (EP) .................................. 01810053

(51) Int. Cl.⁷ .................................................. G02B 6/26
(52) U.S. Cl. ............................... 385/35; 385/47; 385/15
(58) Field of Search ............................. 385/15, 31, 33, 385/35, 36, 38, 47, 76–87, 115–119, 139, 12, 13

(56) References Cited

U.S. PATENT DOCUMENTS

| | | | |
|---|---|---|---|
| 4,695,697 A | | 9/1987 | Kosa et al. |
| 4,763,978 A | * | 8/1988 | Courtney-Pratt et al. ..... 385/47 |
| 5,190,536 A | | 3/1993 | Wood et al. |
| 5,630,788 A | * | 5/1997 | Forkner et al. .............. 600/182 |
| 5,732,166 A | * | 3/1998 | Hamann et al. ............... 385/12 |
| 5,740,291 A | * | 4/1998 | De Lasa et al. .............. 385/31 |
| 6,205,272 B1 | * | 3/2001 | O'Rourke et al. ............. 385/33 |
| 6,400,867 B1 | * | 6/2002 | Liu .............................. 385/33 |
| 6,487,342 B1 | * | 11/2002 | Wu et al. ...................... 385/39 |
| 2001/0000316 A1 | * | 4/2001 | Kawai ......................... 385/33 |

FOREIGN PATENT DOCUMENTS

| DE | 9705768 | 11/1998 |
|---|---|---|
| DE | 9904857 | 2/1999 |

* cited by examiner

Primary Examiner—Akm Enayet Ullah
Assistant Examiner—Michelle R. Connelly-Cushwa
(74) Attorney, Agent, or Firm—Ostrolenk, Faber, Gerb & Soffen, LLP

(57) ABSTRACT

The optical device comprises an emitter optic for projecting a light beam onto an object, and a receptor optic for projecting the reflected light onto a detector. The emitter optic and the receptor optic each comprise a dome disposed in such a manner that the light beam passes through the dome in a plane which is parallel to the plane surface of the dome. This allows a very compact design which is particularly suitable for reflection detectors of small dimensions.

7 Claims, 2 Drawing Sheets

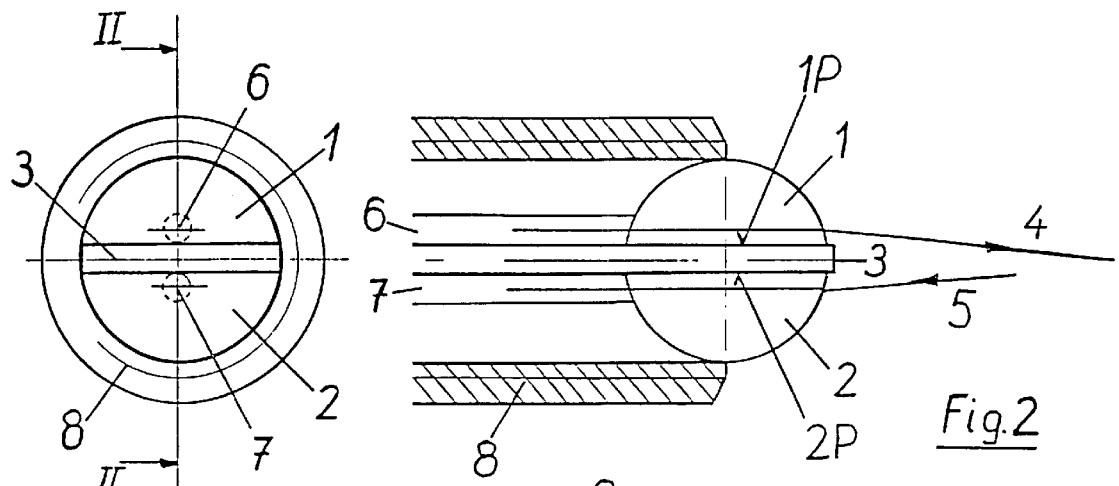
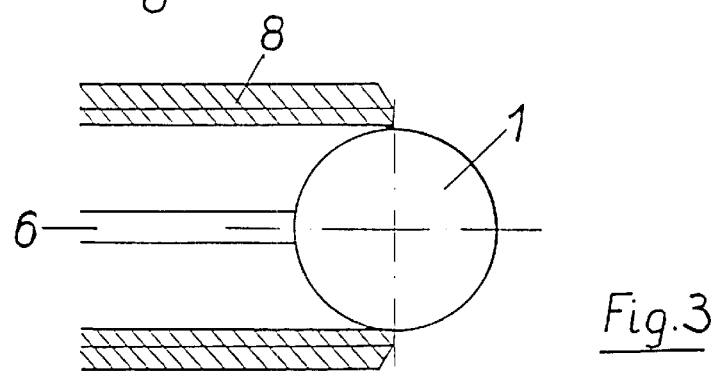

OPTICAL DEVICE

BACKGROUND OF THE INVENTION

The present invention refers to an optical device, more particularly for a reflection detector, comprising an emitter optic for projecting a light beam onto an object and a receptor optic for projecting the reflected light onto a detector.

Reflection detectors require emitter and receptor optics disposed side by side on the front side. Their construction is particularly difficult in the case of compact sensors intended for enclosures having a cross-section of a centimeter or less. Anterior solutions use optical elements molded of synthetic materials which offer very little resistance to aggressive environments and whose surfaces are deteriorated by cleaning. The use of windows or of optical elements of glass complicates the assembly and further reduces the optical aperture and thus the luminous intensity. This is particularly disadvantageous in the case of the mentioned detectors of small dimensions as a limitation of the performance and consequently of the possible applications are the results.

If optical fibers are grouped for producing compact reflection detection systems, the performance of the latter is limited by the angle of aperture. In the case of step-index fibers, which are often used in industrial applications, the angle of aperture is generally close to twice 30°. The fast light dispersion does not allow to distinguish small objects at a distance of some centimeters.

It is therefore necessary to provide a focusing optic at the ends of these fibers, and no satisfying solution has been found for reflection tips smaller than some millimeters. In fact, optical systems including multiple elements are difficult to integrate into tips having a circular opening. Not even the use of relatively expensive index gradient lenses has provided a simpler solution or led to a significant industrial production.

SUMMARY OF THE INVENTION

On the background of this prior art, it is a first object of the present invention to allow the production of an optical device of small dimensions using simple and inexpensive optical elements. A second object is to provide a maximum utilization of a circular opening and thus the highest possible luminous intensity of the optical system, thereby ensuring an optimum performance of the reflection system. A third object is to provide an optical system of a simple construction in order to facilitate its industrial manufacture and to reduce its costs. These objects are attained by an optical device wherein the emitter optic and the receptor optic each comprise a dome disposed in such a manner that the light beam passes through the dome in a plane that is at least approximately parallel to the plane surface of the dome.

In one embodiment, the invention allows to produce a focusing optic disposed at the end of the emitter and receptor fibers and forming a reflection detection tip of some millimeters in diameter.

BRIEF DESCRIPTION OF THE DRAWINGS

The invention will be explained in more detail hereinafter with reference to the attached drawings illustrating embodiments of the object of the invention by way of examples.

FIG. 1 shows a front view of a first embodiment of the invention;

FIG. 2 shows a section according to line II—II of FIG. 1;

FIG. 3 shows a top view of the device of FIG. 2;

DETAILED DESCRIPTION OF PREFERRED EMBODIMENTS

Figure 4:
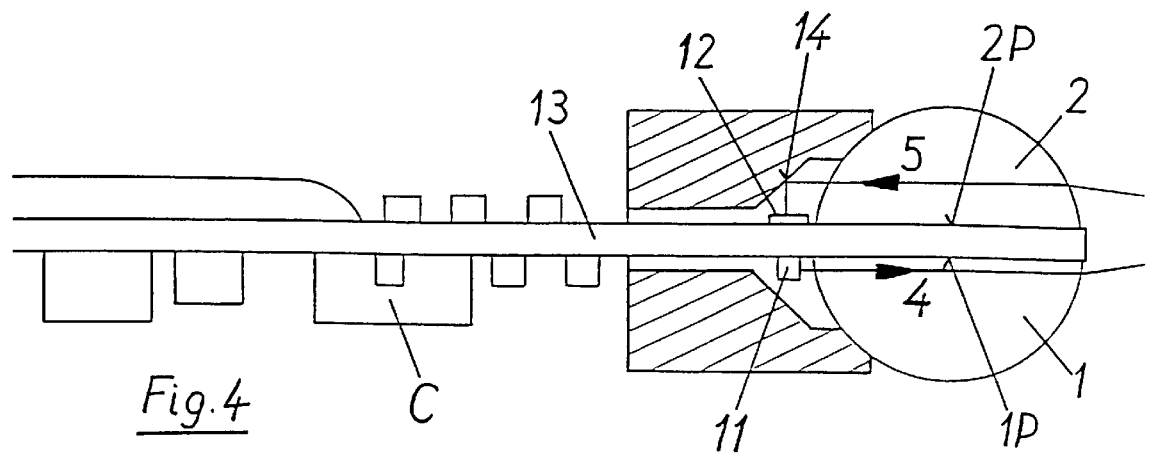
FIG. 4 shows a lateral view of a second embodiment of the invention.

FIG. 1 illustrates an optical fiber reflection tip comprising the optical device of the invention including the emitter and receptor optics.

Optical device 10 of the present invention makes use of domes 1 and 2, which are spherical in the present example, and are disposed on either side of a support 3 ensuring the optical separation of the emitter and receptor channels. Light beam 4 emitted from optical emitter fibers 6 and light beam 5 received by optical receptor fibers 7, respectively, pass through the domes in a plane that is approximately parallel to the plane surfaces 1P and 2P of the domes.

The domes are inserted in the cylindrical opening of a sleeve 8 and form an optical device providing maximum luminous intensity for a given mechanical opening.

The spherical domes may be composed of an optical material selected according to the requirements of the reflection sensor. If a high resistance to chemical reagents is desired, they will be made of glass. Sapphire will be chosen if an increased resistance to mechanical stresses is required in addition.

An important advantage of the resulting detection system is the high resistance of its front surface to chemical reagents and to mechanical stresses and the possibility of cleaning this surface without affecting the optical elements.

A further advantage is the possibility of molding entirely this optical portion, which is very important in industrial sensors.

The optical machining of glass balls and their splitting into domes is effected at low costs by specialized enterprises. The refractive index n=1.76 of sapphire provides a focal distance of the dome which allows a good coupling of the optical fiber by simply placing the latter in contact with the dome. This allows a simple optical coupling ensuring very small losses in the transmission of light between the fiber and the dome.

A further advantage of this optic is that it allows complete molding of the tip, thereby ensuring an excellent stability in the case of shocks and vibrations, and avoiding the ingress of liquids or impurities.

The invention allows to produce focused reflection tips adapted to the requirements of the detection system. The optical system will be integrated into the actual environment by selection of the diameter and the height of the domes. The angle formed by the optical beam and the axis of the tip or of the sensor can be varied by correspondingly positioning the fiber axis with respect to the optical axis of the dome. In the described embodiments, the height of the dome is approximately equal to half the diameter of the dome.

Figure 5:
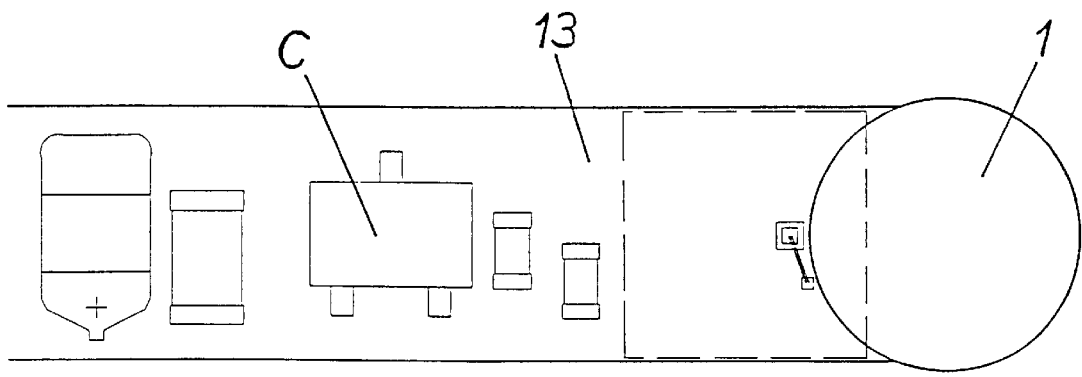
FIG. 5 shows a top view of the device of FIG. 4.

The optical device of the invention including two domes is ideally adapted to a compact reflection sensor of very small dimensions according to FIGS. 4 and 5, which can be molded integrally.

The embodiment of FIGS. 4 and 5 comprises a sensor in which the source is formed of a light emitting diode 11. The two domes 1 and 2 with their plane surfaces 1P and 2P are directly mounted to printed circuit board 13.

After its reflection by a metallized surface 14, receptor beam 5 impinges on a photodiode 12 which is directly mounted and connected to the surface of printed circuit board 13 of the sensor, the printed circuit board serving as a mechanical support and as a screen of the optic. The printed circuit board further comprises electric connections to the amplifier and control circuits C of the sensor.

The preceding description shows that the use of a dome disposed in such a manner that the light beam passes through the dome in a plane which is parallel to the plane surface of the dome allows to produce a very compact optical device for emitter and receptor light beams as the two plane surfaces can be disposed very close to each other, thereby allowing to use a cylindrical sleeve and to obtain a high optical efficiency.

What is claimed is:

1. An optical device, more particularly for reflection detectors, comprising an emitter optic for projecting a light beam onto an object, and a receptor optic for projecting the reflected light onto a detector, wherein the emitter optic and the receptor optic each comprise a dome disposed in such a manner that the light beam passes through said dome in a plane that is at least approximately parallel to the plane surface of said dome.

2. The optical device of claim 1, wherein said domes are mounted with their plane surfaces on a support serving as an optical separation, and wherein optical emitter fibers are connected to one of said domes and optical receptor fibers are connected to the other one of said domes, the entire assembly being disposed in a sleeve.

3. The optical device of claim 2, wherein said domes are spherical and said sleeve is cylindrical.

4. The optical device of claim 1, wherein the height of said dome is approximately equal to half the diameter of said dome.

5. The optical device of claim 1, wherein said domes are mounted with their plane surfaces on a printed circuit board, said printed circuit board comprising a light emitting diode and a receptor in the form of a photodiode.

6. The optical device of claim 5, comprising a reflecting surface for the received beam.

7. The optical device of claim 1, wherein said domes are made of a synthetic material, of glass, or of sapphire.

\* \* \* \* \*